United States Patent [19]

Nagy

[11] Patent Number: 5,079,406

[45] Date of Patent: Jan. 7, 1992

[54] HEATING DEVICE USING A VOLTAGE STABILIZER

[76] Inventor: Laszlo Nagy, Klauzoil Fe'r 14 Fob 1, 1072 Budapest, Hungary

[21] Appl. No.: 553,126

[22] Filed: Jul. 12, 1990

[30] Foreign Application Priority Data

Jul. 12, 1989 [AU] Australia ................................. 3542

[51] Int. Cl.⁵ ................................................. H05B 3/84
[52] U.S. Cl. ..................................... 219/219; 359/512
[58] Field of Search ................. 219/209, 210, 219; 350/582, 588

[56] References Cited

U.S. PATENT DOCUMENTS

| | | | |
|---|---|---|---|
| 2,693,589 | 11/1954 | Hopkins | 219/219 |
| 3,413,438 | 1/1969 | Gardner | 219/210 |
| 4,410,790 | 10/1983 | Berg | 219/219 |
| 4,586,006 | 4/1986 | Emmons | 219/210 |
| 4,593,258 | 6/1986 | Block | 219/210 |
| 4,611,182 | 9/1986 | Chauvin | 219/210 |

Primary Examiner—Teresa J. Walberg

[57] ABSTRACT

A heating device in which a conventional voltage stabilizer having internal heat protection circuitry for limiting the heat which it will or can internally generate and having internal electrical short circuit protection means is employed to generate heat for transfer top heat transfer means. The heating device may be used in connection with automotive external rear view mirrors for removing fog, ice and/or water which condenses on the outer surface of the mirror.

13 Claims, 1 Drawing Sheet

HEATING DEVICE USING A VOLTAGE STABILIZER

BACKGROUND OF THE INVENTION

Mechanisms for creating heat for transfer to other relatively small items, such as automotive external rear view mirrors, are well known in the art. Traditionally, these have employed either resistance circuits to create heat along with a heat transfer plate affixed to the item to be heated. In some instances, light bulbs or lamps have supplied the resistance, and the heat generated by the current through the resistance of the lamp have been used to create heat for transfer to the item to be heated.

Heat transfer mechanisms of the type described above have been described, for instance, in German patent applications Nos. DE-OS 2151856 and in German Patent No. DE-OS 2724018 which describe the use of light bulbs located inside a automotive rear view mirror casing. In DE-OS 2151856, the light bulb is located adjacent the back of the mirror and a conductive plate is situated between the bulb and the mirror to provide a heatable surface through which heat generated by the bulb is transferred to the mirror. In DE-OS 2724018, several such light bulbs are employed.

The light bulbs of the prior art transfer heat primarily by radiation, which tends to be unreliable and spotty. The bulbs tend to draw substantial power, are subject to destruction by shock, and the levels of heat output of the bulb tend to change over time. Still further, the size of the bulb normally required limits its applicability to many devices requiring heating as too often, little space is available in which to mount the bulb. In external rear view mirrors for automotive uses, space is further limited in those mirror assemblies which contain mechanisms for adjusting the position of the face of the mirror, which take up substantial room within the body of the mirror. As one can appreciate, bulb replacement can and often would be a significant problem.

German Patent DE-OS 2724018 is directed to the use of several such bulbs for heating and in particular is directed to the use of a spring mounted mirror adapted for easy removal to permit replacement of the bulbs.

Both of the mirror assemblies described in the German patents discussed above provide heating primarily by irradiation rather than by conduction. In addition, both mirror assemblies described in these patents place the bulbs in positions dictated by the shape of the mirror, and the amount of heat supplied to the mirror is not easily subject to regulation.

In the automotive arts, the literature relating to automotive electronics does not contain material directed to the heating of external rear view mirrors which is either reliable or automatically controls the level of heat to which the mirror is subjected.

OBJECTS OF THE INVENTION

It is an object of the invention to provide means for heating an item to be heated, in particular an external rear view mirror for use in automotive applications, in which the heating means may be positioned adjacent the item to be heated in a manner independent of the shape of the aforesaid item;

It is a further object of the invention to provide means for transferring the heat from the heating means to the item to be heated primarily by conduction;

It is further object of the invention to provide means for heating an item in which the heating means contains means for controlling the temperature of the heating means to limit the amount of heat that can be transferred to the aforesaid item to be heated;

It is a still further object of the invention to provide an integrated voltage stabilizer of the type that employs internal protection against short circuits and internal protection against temperature increases beyond a preset limit, and to operate the aforesaid voltage stabilizer in its short circuit mode to provide heat;

It is a still further object of the invention to provide an automotive external rear view mirror in which a conventional voltage stabilizer containing short circuit protection and means for limiting the temperature of the stabilizer is provided, and in which the aforesaid voltage stabilizer is operated in a manner in which the input and output are connected to each other;

It is a still further object of the invention to provide means for regulating the amount of heat supplied to the item to be heated;

It is a still further object of the invention to provide means for operating the heat source in response to ambient conditions which would generally cause either fog or ice to form;

It is a still further object of the invention to provide means for disabling the heating means as the item to be heated increases in temperature to a preselected level.

BRIEF SUMMARY OF THE INVENTION

In accordance with the instant invention, a conventional integrated voltage stabilizer having internal electrical circuitry which protects the stabilizer against short circuits is employed. This type of stabilizer does not completely shut down when a short circuit is developed. Rather, the stabilizer continues to operate, but its output current is limited by the protective circuitry employed. Such voltage stabilizers are made and sold by a number of manufacturers, such as Motorola and National Semiconductor and are generally and easily available.

Preferably, the voltage stabilizer used will also contain internal circuitry which protects the stabilizer from the effects of overheating. Conventionally, this is achieved by internal circuitry which senses the temperature of the stabilizer, and when the temperature reaches the design limit, the stabilizer's internal circuitry acts to decrease current flow and consequently the production of heat until the temperature reduces below the preselected level.

A type of conventional voltage stabilizer that incorporates short circuit protection and temperature limiting of the type described above is identified as a 78xx type of stabilizer by the various manufacturers of these stabilizers. They are available in forms which provide the capacity to handle different input loads and to produce different output voltages and currents. However, they are generally of the type that have three leads, two of which are input leads, with the remaining lead being an output lead. These stabilizers are quite small, and in one form, are made with a transistor casing for cooling purposes surrounding the majority of the exterior surface of the stabilizer. In a particularly desirable form, the stabilizer has a heat dissipating metallic mounting plate which is connected to the output.

The stabilizers are adapted by their manufacturers to operate as voltage stabilizers. However, the function for which they were designed is of minimal interest in connection with this invention. It is the ability to short circuit the stabilizer and to operate the stabilizer safely in this conditions to provide a preselected output current and to provide a preselected temperature rise which is of importance. In other words, the protective features of the device are being used to operate the device in a manner not intended by its manufacturers and in a manner which would not be readily apparent to those of ordinary skill in the art.

Although the stabilizer, operated in the manner described above, can be used as a controlled heat source in many applications, the invention will be described in terms of an automotive external rear view mirror, although it is to be understood that the invention and its use is not limited to automotive external rear view mirrors.

Automotive external rear view mirrors are generally provided with a casing adapted to be mounted to a car or truck. The mirror is provided with a case the front of which contains a mirror. The rear of the case is spaced from the mirror, and the space between the mirror and the rear of the case contains the voltage stabilizer. The voltage stabilizer has its input connected to the vehicle's electrical system either directly or through one or more switches, such as the ignition switch, and one or more protective fuses, if desired.

The input of the stabilizer is connected to the vehicle electronics, which is generally twelve volts, although the battery voltage may vary according to country. However, most vehicle electrical systems today operate at twelve volts. For best results, the two outputs of the stabilizer are connected directly to each other and to ground, so that the stabilizer is, in effect, short circuited across its outputs.

The stabilizer is mounted behind the mirror and is located within the confines of the mirror casing, so that the mirror casing completely contains the stabilizer therein. When the stabilizer is connected to the vehicle's electrical circuitry, namely when the vehicle's ignition is turned on, current will flow through the stabilizer at a level defined by the short circuit protection means incorporated in the stabilizer. A lamp, which may be a light emitting diode is connected across the input and output. In response to current flow, the light will operate and inform the user that the circuit and the stabilizer are operational and providing heat to the mirror.

In operation, because the stabilizer has been shorted across its output, the stabilizer will draw the maximum current permitted by the short circuit protection means provided internally, and its temperature will begin to rise to the level at which the internal protection circuitry begins to cut off current flow through the stabilizer, thus tending to insure that the temperature to which the stabilizer is subjected does not rise beyond design levels.

As the stabilizer heats up, the heat is transferred to the mirror through a metal heat conducting plate, such as aluminum, which is mounted adjacent to the rear surface of the mirror. The stabilizer may be mounted directly on the heat conducting plate, and heat will transfer from the stabilizer to the heat conducting plate through the connection between the stabilizer and plate. For best results, the means for mounting the stabilizer to the heat conducting plate should itself be heat conducting.

The heat transferred to the heat conducting plate will spread across the plate and be transferred to the mirror to reduce or remove fog, or to remove ice, snow and or water, as the case may be.

The temperature at the surface of the mirror can be controlled by spacing the stabilizer from the heat conducting plate. Alternatively, the heat conducting plate can be spaced from the rear of the mirror and the air gap or a het conducting material can be inserted in the space to control heat conductivity to the mirror. Or, if desired, a combination of the two approaches can be employed.

In another form of the invention, an impedance can be connected to the output leads of the voltage stabilizer. In this form of the invention, the impedance acts to turn output current into heat which can be used to further heat the heat conducting plate. When using an output impedance, it is desirable to employ a stabilizer whose output voltage is defined, and in particular an output voltage which is about ⅔ that of the nominal voltage of the electrical network to which the stabilizer is connected. For instance, in an automotive electrical network in which the nominal voltage is 12 volts, the defined output voltage should be 8 volts. In this manner, the heat generated by the external impedance can be defined and controlled. To keep the heat generated by the external impedance to acceptable initial levels, it is best if the external impedance have a value equal to about 0.2 times the value of the load represented by the stabilizer in its short circuit mode in the circuit.

If desired, one or more switches may be placed in the circuit between the electrical network of the vehicle and the stabilizer which switches sense external conditions, such as heat and humidity levels. One or more of this type of switch may be used as a replacement for a manually operated switch, or in addition to the manually operated switch.

When used as a replacement for the manually operated switch, the switch will close when the conditions for which the switch was designed have been met, such as a particular temperature, say 40 or 50 degrees fahrenheit. When the defined condition exists, the switch will close and the voltage stabilizer will operate to supply heat to remove fog and condensate and, if the temperature drops below freezing, to remove snow and/or ice. At higher temperatures, when the dew point is equal to the ambient temperature, a humidity sensor can be employed in place of the manual switch to sense ambient humidity and, if the level of relative humidity is sufficiently high, the switch will close.

Of course, the stabilizer can be connected directly into the electrical network of the vehicle and will operate whenever the vehicle is operated. The temperature and/or humidity sensors described above will remain open to prevent current from flowing to the stabilizer until and unless the particular ambient conditions have been met, at which time the appropriate switch will close to permit the stabilizer to operate to supply heat to the mirror.

The temperature and/or the humidity sensing switches are placed in series with the stabilizer so that the input of the stabilizer is connected to the vehicle electrical network through the switch or switches. If both the humidity and the temperature switches are employed, the switches are placed in the circuit so that each of the switches are not only in series with the vehicle electrical network, but also in parallel with each other. Accordingly, when the ambient temperature is high and the temperature switch remains open, if the ambient relative humidity is high, the humidity switch will close to allow current flow to the stabilizer to remove fog and/or water from the surface of the mirror.

If desired, the temperature and/or humidity sensors may have incorporated therein conventional timing means for timing the length of the time the switch has been in its closed condition, and to open the switch after a preselected length of time has elapsed, and the system will reset. Accordingly, if ambient conditions remain sufficient to operate the switches again, the appropriate switch or switches will close and the stabilizer will again be connected into the vehicle electrical network to supply heat to the mirror.

Best results are obtained by using a stabilizer capable of sustaining temperatures in excess of 100 degrees centigrade before the protective circuitry of the stabilizer acts to reduce or cut off further current flow through the stabilizer. Heat at this level tends to insure that the stabilizer will supply heat sufficient to remove fog at most vehicle ambient operating conditions and will tend to insure that external rear view mirrors are capable of providing rear visibility to the vehicle operator. However, if one desires to employ lower temperatures, this can be done either by selection of an appropriate stabilizer from the 78xx or similar series, or by moving the stabilizer further away from the rear of the mirror.

In use, the stabilizer, as it heats up internally, will transfer this heat to its case, which in the particular stabilizer series, namely the 78xx type, is made of transistor casing material designed to remove heat from the device to protect the internal circuitry of the stabilizer. Heat transfer to the rear of the mirror occurs in part by conduction through the means connecting the stabilizer to the heat conducting plate, and by radiation and/or convection from the stabilizer, again to the heat conducting plate. The heat conducting plate spreads the heat it receives, primarily through conduction, across the entire heat conducting plate. The plate is preferably made of a good heat conducting material, such as aluminum. The heat across the plate will therefore be fairly uniform, and will tend to insure that the heat delivered to the face of the mirror is also fairly uniform.

If desired, heat uniformity can be increased, and the level of heat available to the mirror itself can be controlled by spacing the heat conducting plate from the rear surface of the mirror. In doing so, the air gap created tends to insure still more uniform heating across the mirror than would be the case if the heat conducting plate were used as the primary means of insuring heating uniformity across the mirror.

The stabilizer can be mounted in most if not all existing external rear view mirror assemblies. In addition, existing rear view mirror assemblies now in use can be easily retrofitted to take advantage of the invention. Still further, the stabilizers are inexpensive, and the circuitry employed to operate the stabilizer to achieve the heat output according to the invention is also inexpensive. Still further, the stabilizer, in particular those of the 78xx variety, are essentially solid state devices, are small and easy to mount in small spaces, and have substantial lifetimes, especially when operated to take advantage of its protective features.

Although the foregoing discussion has been centered on the use of a single voltage stabilizer in accordance with the invention, it is to be understood that more than one stabilizer to supply heat may be employed in connection with a mirror assembly. It may be desirable to supply several such stabilizers in connection with large mirror surfaces to insure more even heating across such large surfaces such as are employed in large external rear view mirrors used, for instance, in connection with trucks and recreational vehicles.

BRIEF DESCRIPTION OF THE DRAWINGS

Referring now to the drawings, in which like numbers refer to like parts.

A switch K is depicted which switch may be a manual switch for opening and closing the circuit. The manual switch may be replaced with a conventional temperature sensor which, in response to ambient temperature, opens and closes the circuit, or a conventional humidity sensor which, in response to ambient humidity conditions, can open and close the circuit. Of couse, both the temperature and humidity sensors can be used together if placed in parallel with each other (not shown).

As one skilled in the art can appreciate, the stabilizer F, with its outputs 2 and 3 connected to each other, has been in effect short circuited. Short circuiting the stabilizer does not damage the stabilizer, as it contains, as part of its design, means for protecting the stabilizer against short circuits. The means for protecting the stabilizer against short circuits in effect limits the current through the stabilizer, thus producing continous output levels which would otherwise rise to intolerable levels if the stabilizer did not have such short circuit protection. It provides a stable "short circuit" current and voltage which does not require any further or additional circuitry to adjust the current or power or to keep such within limits that are safe for the stabilizer. Between the input and the output of the stabilizer, a cooling capacitor (not shown) can be connected in parallel. This way, both the heating capacity of the integrated circuit, and its protection against incoming current spikes can be improved and possible interference with radio signal reception can be eliminated.

Figure 2:
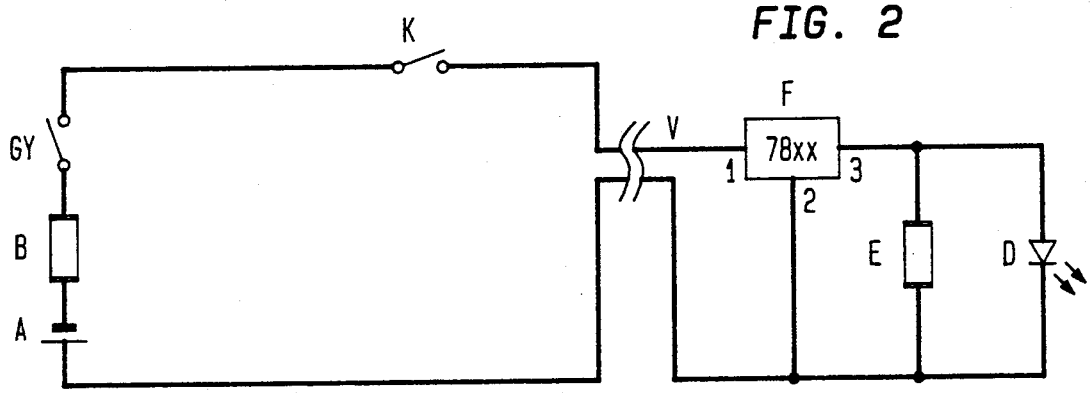
FIG. 2 depicts another circuit which can be employed and which embodies the invention.

An alternative embodiment of an electronic circuit incorporating the voltage stabilizer is shown in FIG. 2. In the embodiment shown in FIG. 2, an impedance E is connected in parallel with a light emitting diode D, and the impedance and diode are in turn serially connected to the outputs 2 and 3 of the voltage stabilizer F.

The impedance E is low and represents an impedance similar to that of a short circuit connection. The light emitting diode D represents either an open or a closed circuit. The light emitting diode is employed as an indicator to advise the user that the circuit and the stabilizer are in operation.

Figure 1:
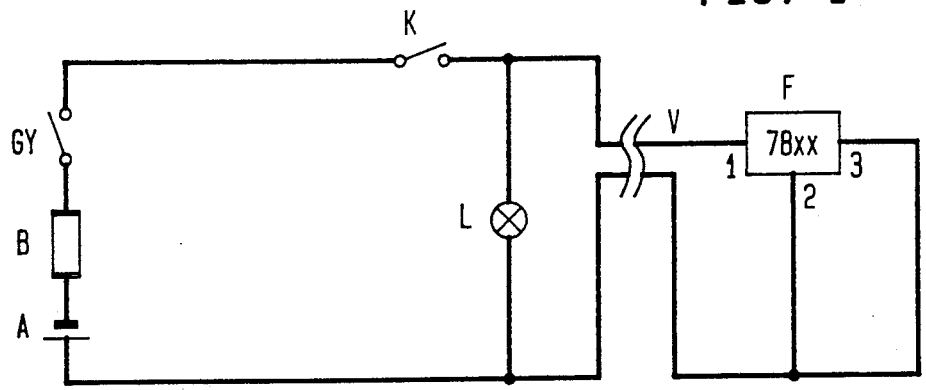
FIG. 1 depicts a preferred circuit for the device of the invention.
Figure 3:
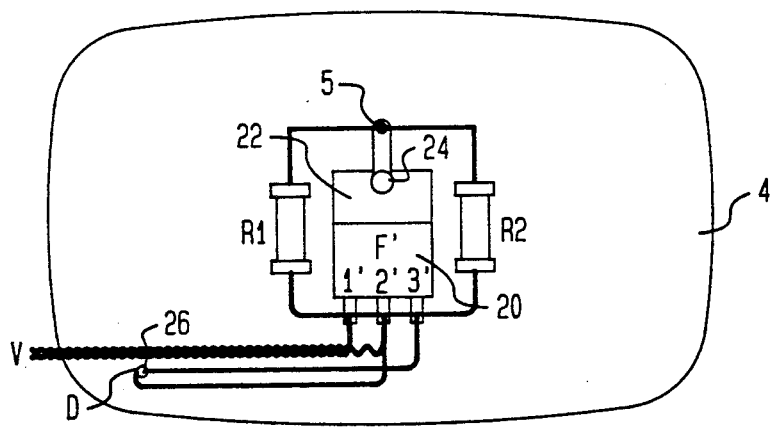
FIG. 3 depicts a 78xx integrated voltage stabilizer connected into another form of circuit in accordance with the instant invention; and Referring now to FIG. 1, which depicts one embodiment of a circuit useful in connection with the instant invention, in which the switch GY refers to a manual switch which, in an automotive environment, may be a vehicle ignition switch. The switch is connected to fuse B, which in turn is connected to a battery A, which in an automotive environment may be the vehicle battery. In series connection with the switch GY is the input lead 1 of an integrated voltage stabilizer F of the 78xx or equivalent type. Output leads 2 and 3 are connected to each other to provide a short circuit between the aforesaid two output leads. The output leads 2 and 3 are serially connected to the battery A, and to ground (not shown).

FIG. 3 depicts another embodiment of the invention. The stabilizer F' has a casing 20 made of a conventional transistor casing material used to cool transistors, and a mounting plate 22 made of metal. The input 1', and the outputs 2' and 3' are shown and are the same as those represented symbolically in FIGS. 1 and 2. The metal mounting plate 22 is connected to ground internally.

A metal heat transfer plate denoted by the numeral 4 is provided. The stabilizer is mounted on the heat transfer plate 4. For best results, the stabilizer is mounted by means of a screw 24 to the plate, and a silicon or other grease having good heat transfer characteristics is used to aid heat transfer by conduction from the stabilizer plate 22 to the heat transfer plate 4.

The heat transfer plate 4 is shaped similarly to the mirror on which it will be mounted. The plate 4 can be mounted directly to the rear of the mirror (not shown) using an adhesive capable of transferring heat from the plate 4 to the rear of the mirror (not shown), or it can be mounted spaced from the rear of the mirror (see FIG. 5) to create an air gap to aid in the even distribution of the transferred heat across the mirror by convection and radiation.

To the metallic plate 22 of the voltage stabilizer 22, the soldering point 5 is connected by means of a screw, and the outputs of the resistors R1 and R2, forming the impedance E indicated symbolically in FIG. 2, are connected in parallel with each other, is connected to this point. The other outputs of the resistors R1, R2 are soldered together to the external output 3 of the voltage stabilizer F, and to the same point is also connected the anode of the light emitting diode D which is in turn mounted in the cavity 26 located in the lower part of the heat conducting metallic plate 4. The cathode of the light emitting diode D is connected to the output 2 of the voltage stabilizer F.

The resistors R1 and R2 are preferably made of metal and capable of dissipating power as heat. For best results, the resistors are located along two sides of the stabilizer, and in this configuration, aid in heating the heat conductive plate by transferring heat to the plate either by conductivity if the stabilizer is mounted on the heat conductive plate, or by radiation and convection if the resistors are spaced from the heat conductive plate.

In the embodiment shown in FIG. 3, the voltage stabilizer F is not operating in short circuit mode because of the presence of the output impedance across the outputs leads 2, 3. A loading current, which is considerably higher that the nominal value, namely on the order of several times the nominal value, flows through the stabilizer as well as through the resistors R1 and R2. Accordingly, power dissipation in the form of heat is handled by the stabilizer and by the resistors. If the resistors are mounted spaced from the stabilizer as depicted, heat transfer from the resistors by irradiation of, and convection to, the heat conducting plate 4 is increased. However, it is to be understood that the additional resistors are not required, and the stabilizer can be employed operating in its short circuit mode to protect the stabilizer, and to control the heat generated and transferred by conduction and irradiation to the heat conducting plate 4.

Figure 4A:
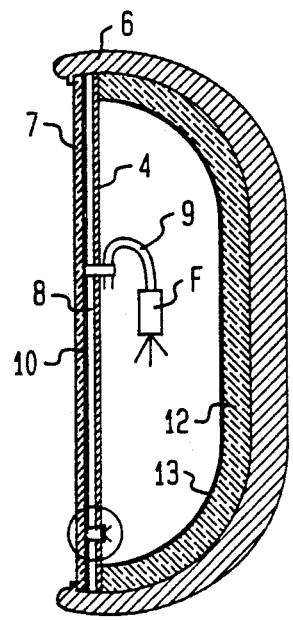
Figure 4B:
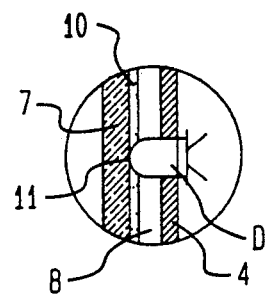

Wire V depicted in FIG. 4 connects the input lead 1' and output lead 2' to the vehicle electrical network to supply power to the system.

FIG. 4 shows another method for mounting the voltage stabilizer F which differs from the previously described embodiments. In the casing 6 of the external rear view mirror indicated in section, the mirror plate 7 is elevated from the plane of the rim of casing 6, and the metallic heat conducting plate 4 is separated from it by an air gap 8. Most mirrors have an anterior amalgam layer which can be damaged by overheating. The use of the air gap 8 helps insure that the amalgam layer 10 of the mirror plate 7 remains intact by keeping the heated surface of the plate away from the amalgam layer. The air gap also helps better distribute the heat evenly across the surface of the mirror. The metallic plate 4, if it is affixed to the mirror plate 7, may overheat the anterior amalgam layer, thus causing local metamorphosis and damage in the amalgam layer 10 even though the temperature of the metallic plate 4 is relatively even across its surface.

The voltage stabilizer F is mounted to one end of a U-shaped bi-metallic bridle 9, in the manner illustrated. The other end of the bridle 9 is mounted by means of a screw or—as shown in the figure—by riveting to the rear of the heat conducting metallic plate 4. For the sake of simplicity, the connection of the wire V to the voltage stabilizer F has been omitted from the drawing, although it is be understood that the connection does in fact exist. The light emitting diode D is located in the cavity denoted by the numeral 11 situated in the lower corner area of the metallic plate 4. A number of such holes 11 can be formed if desired to accept more than one such diode. When the diode is on and emitting light therefrom, its "on" state is visible to the user through holes 11.

In an external rear view mirror, by way of example, on the internal side of the casing 6, a heat insulating layer 12 may be incorporated with a heat reflecting foil 13 formed on its internal side. Consequently, in the casing of the rear vision mirror, a relatively small amount of electric power is sufficient to evaporate water, ice, and vapor on the external surface of the mirror plate 7, by means of heat radiating from the heat conducting metallic plate 4 to the rear surface of the mirror, and by conduction from the plate 4 to the air between the plate 4 and the mirror.

The use of the integrated voltage stabilizer F with a fixed output voltage in the manner described, i.e. short circuited, is a departure from the standard use of the aforesaid stabilizer by those skilled in the art. On the other hand, this unique use of the stabilizer tends to eliminate the need to adjust, regulate and otherwise protect the vehicle electrical system against a short circuit drain, and to protect other such electronic elements which may also be used in connection with the invention, such as temperature sensors and/or humidity sensors. The voltage stabilizer F, of the 78xx variety, has a casing similar to that used to house and cool transistors. Te casings are used as thermostats to regulate transistor heat build up. Accordingly, the casing temperature can therefore be regarded as constant within relatively narrow temperature limits, as the casing is quite efficient at dissipating heat.

The invention described above is not limited to the embodiments shown, and it is intended to cover all such uses of the invention which fall within the spirit and scope of the invention as defined by the claims appended hereto.

What I claim is:

1. In a device containing a surface to be heated, a voltage stabilizer of the type containing means for limiting the current to and through the stabilizer when the stabilizer is short circuited, said stabilizer mounted adjacent the surface to be heated, said stabilizer having an output lead, a ground lead and an input lead; means for connecting the output and ground leads to each other so that the stabilizer, when energized, will operate in its short circuit mode, and means for connecting the input lead to a source of electrical power for operating the said stabilizer, said stabilizer generating heat when in operation; and means for transferring the heat generated by the said stabilizer during operation to the surface to be heated.

2. The heating device according to claim 1, in which the means for connecting the output and ground leads to each other is a short circuit connection.

3. The heating device according to one of claims 1 and 2 further comprising light emitting means in parallel connection with the input lead of the said stabilizer, said light emitting means being adapted to operate and supply light to indicate that the stabilizer has been energized and is operational.

4. The heating device according to claim 1 in which the device to be heated is an automotive external rear view mirror.

5. The heating device according to claim 4 in which the said rear view mirror comprises a mirror mounted in a casing, said stabilizer mounted in said casing and spaced from the anterior surface of the said mirror; said means for transferring heat from the stabilizer to the surface of the mirror comprising a heat conducting metal plate mounted in proximity to the anterior surface of the mirror; and means for transferring the heat generated by the stabilizer to the mirror by conduction comprising means for mounting the stabilizer on said heat conducting plate which is capable of conducting heat from the stabilizer to the heat conducting plate.

6. The device according to claim 5 in which the stabilizer is spaced a preselected distance from the heat conducting plate.

7. The device according to claim 6 in which the means for transferring heat from the stabilizer to the heat conducting plate comprises a screw made of heat conducting material.

8. The device according to claim 6 in which the means for transferring heat from the stabilizer to the heat conducting plate is a bi-metallic bridle.

9. The device according to claim 5 in which the heat conducting plate is mounted such that it is spaced a preselected distance from the anterior surface of the mirror.

10. The device according to claim 1 further comprising an impedance connected to the output of the said stabilizer, in which the impedance has a ohmic resistance having a value equal to about one fifth of the nominal load of the said stabilizer load.

11. The device according to claim 10 in which the impedance comprises a pair of resistors made of metal, said resistors being located along two sides of the said stabilizer.

12. The device according to claim 1 in which a switching means comprises a temperature sensor adapted to close a switch when ambient temperature reaches a preselected level to permit power to flow to the stabilizer.

13. The device according to claim 1 in which a switching means comprises a humidity sensor adapted to close a switch when ambient humidity reaches a preselected level to permit power to flow to the stabilizer.

* * * * *